(12) United States Patent
Liu et al.

(10) Patent No.: US 11,131,439 B2
(45) Date of Patent: Sep. 28, 2021

(54) LIGHTING DEVICE

(71) Applicants: OPPLE LIGHTING CO., LTD., Shanghai (CN); SUZHOU OPPLE LIGHTING CO., LTD., Suzhou (CN)

(72) Inventors: Chaobo Liu, Shanghai (CN); Hongbo Wang, Shanghai (CN); Qingjun Wei, Shanghai (CN)

(73) Assignees: Opple Lighting Co., Ltd., Shanghai (CN); Suzhou Opple Lighting Co., Ltd., Suzhou (CN)

( * ) Notice: Subject to any disclaimer, the term of this patent is extended or adjusted under 35 U.S.C. 154(b) by 0 days.

(21) Appl. No.: 16/829,551

(22) Filed: Mar. 25, 2020

(65) Prior Publication Data
US 2020/0224852 A1 Jul. 16, 2020

Related U.S. Application Data

(63) Continuation of application No. PCT/CN2018/107376, filed on Sep. 25, 2018.

(30) Foreign Application Priority Data

Sep. 28, 2017 (CN) .......................... 201710897781.2
Sep. 28, 2017 (CN) .......................... 201710900652.4
(Continued)

(51) Int. Cl.
*F21V 5/00* (2018.01)
*F21V 3/10* (2018.01)
(Continued)

(52) U.S. Cl.
CPC .............. *F21V 5/007* (2013.01); *F21S 8/085* (2013.01); *F21V 3/10* (2018.02); *F21V 5/04* (2013.01);
(Continued)

(58) Field of Classification Search
CPC .... F21V 5/007; F21V 5/04; F21V 3/10; F21S 8/085
See application file for complete search history.

(56) References Cited

U.S. PATENT DOCUMENTS 6,784,357 B1* 8/2004 Wang ...................... H02S 40/38
136/244
7,637,630 B2* 12/2009 Wilcox ..................... G09F 9/33
362/267
(Continued)

FOREIGN PATENT DOCUMENTS

CN 102261617 A 11/2011
CN 202791792 U 3/2013
(Continued)

OTHER PUBLICATIONS

International Search Report (including English translation) and Written Opinion issued in PCT/CN2018/107376, dated Feb. 3, 2019, 12 pages.

*Primary Examiner* — William N Harris
(74) *Attorney, Agent, or Firm* — Arch & Lake LLP

(57) ABSTRACT

The present disclosure discloses a lighting device, including a light body, a light source module mounted in the light body, and a light transmissive portion covering the light source module. The light source module includes a plurality of lenses and a light emitting unit accommodated in each of the lens; light emitted by the light emitting unit is emitted from the light transmissive portion after being distributed by the lens; the light transmissive portion is arc-shaped; and an incident angle corresponding to incident light at any point of the light transmissive portion is smaller than 45°. In the lighting device according to the present disclosure, by designing the light transmissive portion to be arc-shaped, the
(Continued)

incident angle corresponding to the incident light on the light transmissive portion is limited within 45°.

20 Claims, 5 Drawing Sheets

(30) Foreign Application Priority Data

Sep. 28, 2017 (CN) .......................... 201721258961.8
Sep. 28, 2017 (CN) .......................... 201721265861.8

(51) Int. Cl.
*F21S 8/08* (2006.01)
*F21V 5/04* (2006.01)
*F21V 29/70* (2015.01)
*F21Y 105/16* (2016.01)
*F21Y 115/10* (2016.01)
*F21W 131/103* (2006.01)

(52) U.S. Cl.
CPC ........ *F21V 29/70* (2015.01); *F21W 2131/103* (2013.01); *F21Y 2105/16* (2016.08); *F21Y 2115/10* (2016.08)

(56) References Cited

U.S. PATENT DOCUMENTS

| | | | | |
|---|---|---|---|---|
| 8,092,042 B2 * | 1/2012 | Wilcox | ................... | F21S 8/086 362/249.02 |
| 8,858,024 B2 * | 10/2014 | Wu | ................... | F21V 29/763 362/244 |
| 9,470,394 B2 * | 10/2016 | Kinnune | ................. | F21V 5/007 |
| 2008/0068799 A1 * | 3/2008 | Chan | ................... | F21V 29/763 361/697 |
| 2009/0046460 A1 * | 2/2009 | Li | ................... | F21V 5/007 362/240 |
| 2011/0068708 A1 * | 3/2011 | Coplin | ................... | F21V 29/75 315/294 |
| 2012/0050889 A1 * | 3/2012 | Lu | ................... | F21V 5/007 359/718 |
| 2012/0051047 A1 * | 3/2012 | Lu | ................... | G02B 3/0056 362/235 |
| 2013/0083516 A1 * | 4/2013 | Yoon | ................... | F21V 29/74 362/190 |
| 2015/0204512 A1 | 7/2015 | Chen | | |
| 2018/0051863 A1 * | 2/2018 | Lee | ................... | G02B 19/0061 |
| 2018/0231213 A1 * | 8/2018 | Kang | ................... | F21V 5/007 |

FOREIGN PATENT DOCUMENTS

| | | |
|---|---|---|
| CN | 104654196 A | 5/2015 |
| CN | 104864295 A | 8/2015 |
| CN | 206347451 U | 7/2017 |
| CN | 107477478 A | 12/2017 |
| CN | 107477517 A | 12/2017 |
| JP | 2015015281 A | 1/2015 |

* cited by examiner

LIGHTING DEVICE

CROSS-REFERENCE TO RELATED APPLICATIONS

This application is based upon and claims the priority of PCT patent application No. PCT/CN2018/107376 filed on Sep. 25, 2018 which claims the priority of Chinese Patent Application No. 201710897781.2 filed on Sep. 28, 2017, Chinese Patent Application No. 201710900652.4 filed on Sep. 28, 2017, Chinese Patent Application No. 201721258961.8 filed on Sep. 28, 2017, and Chinese Patent Application No. 201721265861.8 filed on Sep. 28, 2017, the entire content of all of which is hereby incorporated by reference herein for all purposes.

TECHNICAL FIELD

The present disclosure relates to a lighting field, and more particularly, to a lighting device.

BACKGROUND

A lighting device generally includes several basic components, such as a light body, a light source module and a front cover.

SUMMARY

The present disclosure provides a lighting device and a method of manufacturing a lighting device.

According to one aspect, the present disclosure provides a lighting device. The light device may include a light body, a light source module mounted in the light body, and a light transmissive portion covering the light source module, in which, the light source module may include a plurality of lenses and a light emitting unit accommodated in each of the plurality of lenses, light emitted by the light emitting unit may be emitted from the light transmissive portion after being distributed by the lens, the light transmissive portion may be arc-shaped, and an incident angle corresponding to incident light at any point of the light transmissive portion may be smaller than 45°.

According to another aspect, the present disclosure provides a method of manufacturing a lighting device. The method may include providing a light body; mounting a light source module on the light body; covering the light source module using a light transmissive portion; providing the light source module with a plurality of lenses and a light emitting unit accommodated in each of the plurality of lenses; and emitting light by the light emitting unit from the light transmissive portion after being distributed by the lens, where the light transmissive portion may be arc-shaped, and an incident angle corresponding to incident light at any point of the light transmissive portion may be smaller than 45°.

It is to be understood that both the foregoing general description and the following detailed description are exemplary and explanatory only and are not restrictive of the present disclosure.

BRIEF DESCRIPTION OF THE DRAWINGS

The drawings illustrated here are provided for further understanding the examples of the present disclosure and constitute a part of the present disclosure, and are used for explaining the present disclosure together with the examples of the present disclosure and description thereof, rather than improperly limiting the present disclosure. In the drawings.

DETAILED DESCRIPTION

Figure 1:
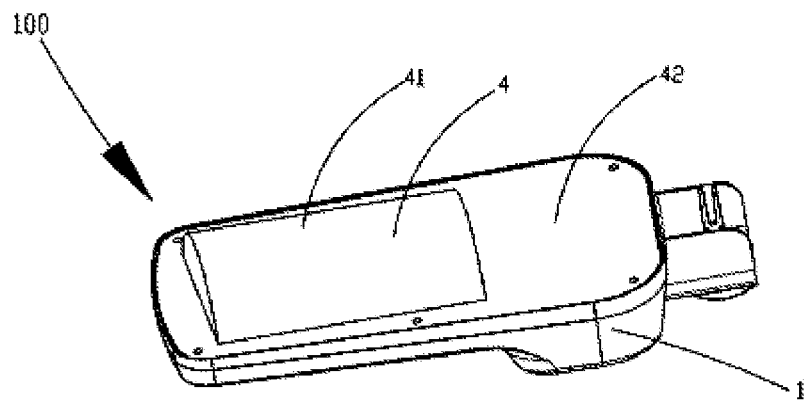
FIG. 1 is a stereoscopic view of a lighting device according to Example 1 of the present disclosure.

In order to make objects, technical details and advantages of the present disclosure apparent, the technical solutions of the present disclosure will be described in connection with the examples of the present disclosure and the corresponding drawings. It is obvious that the described examples are just a part but not all of the examples of the present disclosure. Based on the examples described herein, those ordinarily skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

The front cover included in a lighting device may be transparent. When an incident angle of light incident on the front cover of the lighting device is larger than a certain value, a certain proportion of the light is reflected by the front cover. As shown in Table 1 below, when taking parallel light incident on a flat glass front cover of a lighting device as an example, statistics of reflectance at different incident angles are provided.

TABLE 1

| Incident angle | Reflectance |
| --- | --- |
| Incident angle of 0° (vertical incidence) | 8% |

TABLE 1-continued

| Incident angle | Reflectance |
| --- | --- |
| Incident angle of 15° | 8% |
| Incident angle of 30° | 9% |
| Incident angle of 45° | 10% |
| Incident angle of 60° | 17% |
| Incident angle of 65° | 22% |
| Incident angle of 70° | 30% |
| Incident angle of 75° | 41% |

It can be known from Table 1 above that, the larger the incident angle of the light incident on the front cover is, the more of the light is reflected. Because the front cover has relatively high reflectance for light with a large incident angle, light emitted at a large angle has intensity loss when passing through the front cover, which causes great change in light distribution during the light is emitted through the front cover, and also reduces light distribution efficiency of the lighting device.

In conjunction with FIG. 1 to FIG. 6, Example 1 of the present disclosure provides a lighting device 100, comprising a light body 1, a light source module mounted in the light body 1, and a front cover 4 covering the light source module, in which, the light source module includes a light-emitting component 2 and a plurality of lenses 3 that distribute light from the light-emitting component 2, and light emitted from the lens 3 is emitted through the front cover 4. The lighting device 100 provided by the example of the present disclosure for example is applied as a street lamp; a heat radiator 5, a reflector 6, and a driving power supply component (not shown) are further provided in the light body 1; and a cushion ring 7 is further provided between the light body 1 and the front cover 4.

Hereinafter, respective elements in the lighting device 100 provided by Example 1 of the present disclosure and configuration relationships between the elements will be described in detail.

Figure 2:
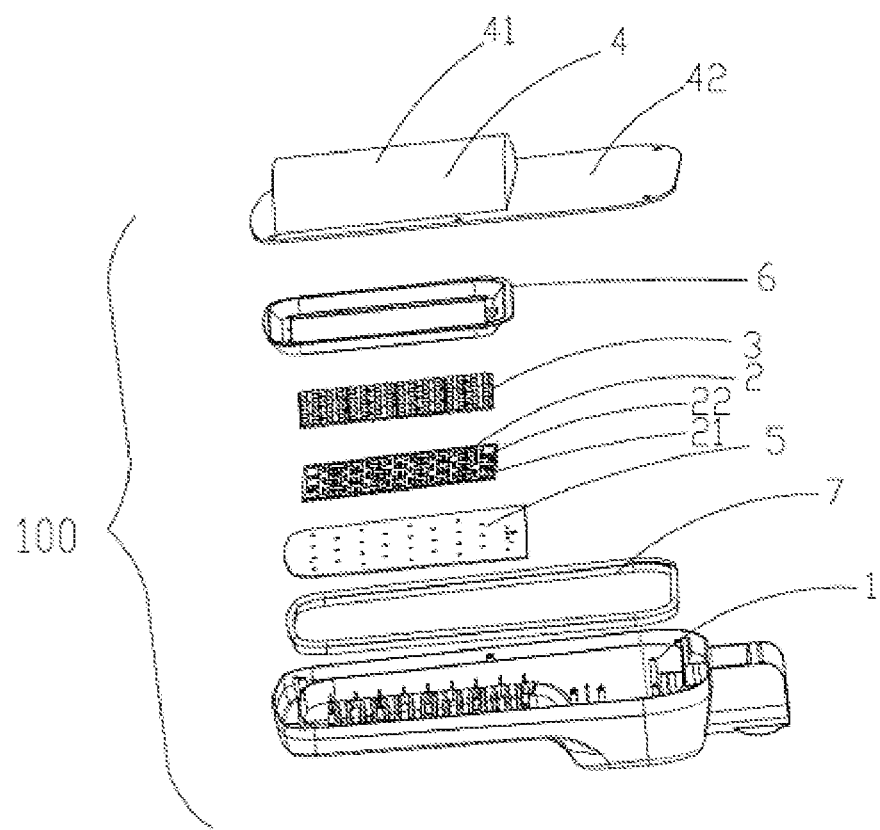
FIG. 2 is a stereoscopic exploded view of the lighting device according to Example 1 of the present disclosure.

Referring to FIG. 2, the light body 1 is formed with an accommodating space; and the light-emitting component 2, the lens 3, the heat radiator 5 and the reflector 6 are all accommodated in the accommodating space, in which, the heat radiator 5 is provided below the light-emitting component 2, and the reflector 6 is provided on a periphery of the light source module. In this example, the reflector 6 causes diffuse reflection; and because the light-emitting component 2 according to this example sinks a bit, in order to further improve light-emitting efficiency of the light source module, the reflector 6 is provided so that a small portion of light emitted by the light source module that otherwise is not incident on the front cover 4 is reflected by the reflector 6 to the front cover 4 and then is emitted from the front cover 4. In other alternative examples, in a case where a position of the light-emitting component 2 is flush with a bottom of the front cover 4, the reflector 6 may not be provided.

The front cover 4 includes a light transmissive portion 41 corresponding to the light source module and a coated portion 42 not corresponding to the light source module. The light transmissive portion 41 is made of transparent glass, which allows light emitted by the light source module to pass through. The coated portion 42 has a layer of opaque material coated on the transparent glass to shield a portion inside the light body 1 where no light source module is provided, so that the lighting device is more beautiful. The opaque material coated to the coated portion 42 is preferably a high temperature resistant material, which prevents the coated opaque material from falling off or aging during the lighting device works at a high temperature. FIG. 1 only schematically shows a stretched arc-shaped front cover, but the shape of the front cover 4 is not limited to the stretched shape; as long as a condition of the incident angle is satisfied, the arc of the front cover 4 may be irregular.

Figure 3:
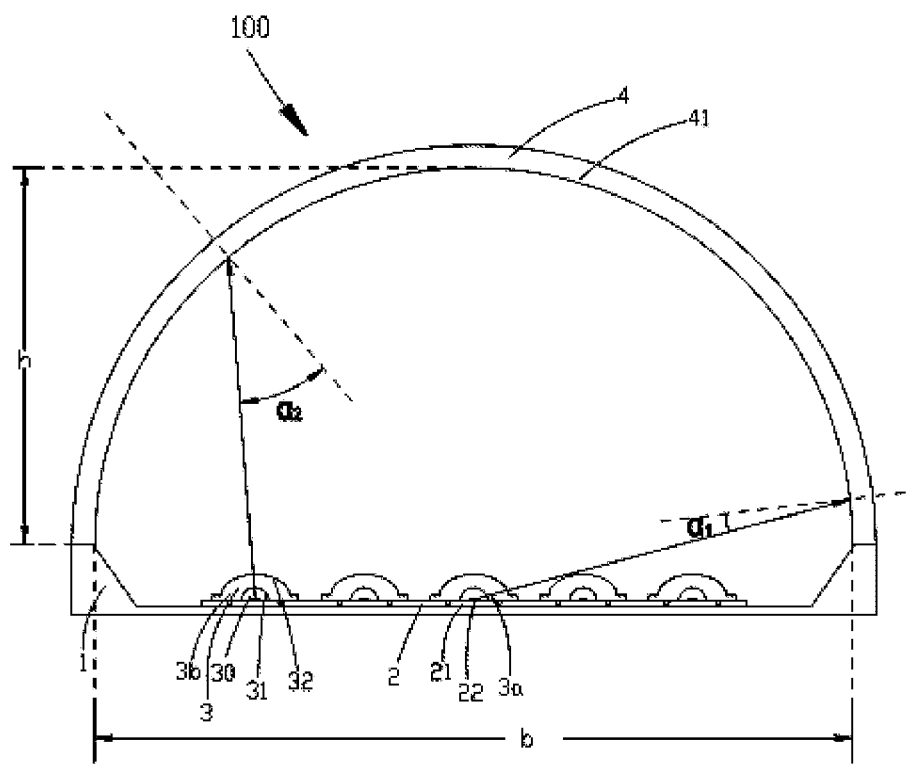
FIG. 3 is a cross-sectional schematic view of the lighting device according to Example 1 of the present disclosure.
Figure 4:
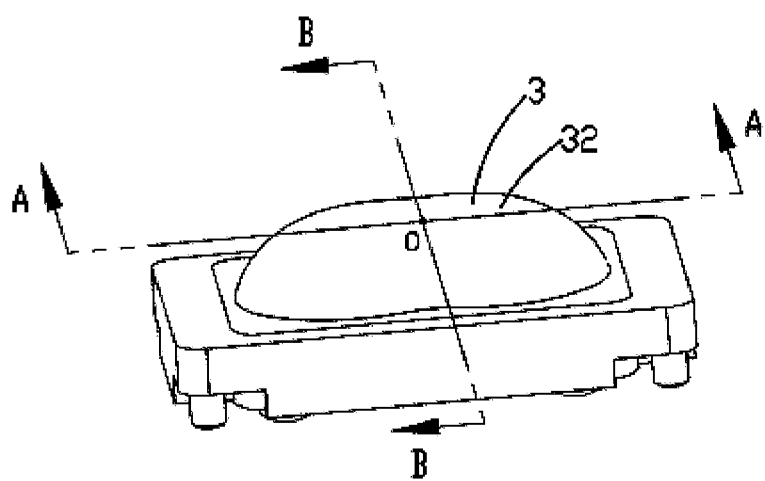
FIG. 4 is a stereoscopic view of a lens in the lighting device according to Example 1 of the present disclosure.

Referring to FIG. 2 and FIG. 3, the light-emitting component 2 includes a light source board 21 and a plurality of light emitting units 22 provided on the light source board 21. The light emitting units 22 may be arranged in one row or several rows. In this example, the light emitting units 22 are arranged in an array on the light source board 21. The light emitting unit 22 is an LED light source. In other alternative examples, several light emitting units 22 correspond to one lens 3.

Figure 5:
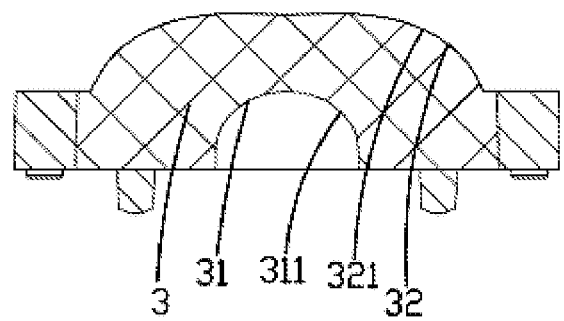
FIG. 5 is a cross-sectional view taken along line A-A in FIG. 4.
Figure 6:
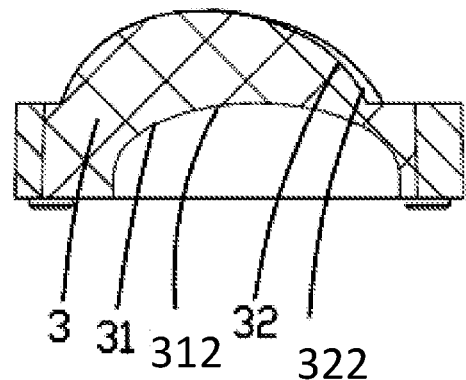
FIG. 6 is a cross-sectional view taken along line B-B in FIG. 4.

Referring to FIG. 3 to FIG. 6, the lens 3 has an inner surface 31, an outer surface 32, and an accommodating chamber 30 enclosed by the inner surface 31; and the light emitting unit 22 is accommodated in the accommodating chamber 30. Referring to the stereoscopic view of the lens 3 shown in FIG. 4, the lens 3 has an axisymmetric structure; a length direction of the lens 3 is defined as a longitudinal direction; a width direction of the lens 3 is defined as a lateral direction; an intersection point of a central line of the lens 3 in the longitudinal direction and a central line of the lens 3 in the lateral direction is a geometric center O point; and a cross-section passing through the geometric center O point of the lens 3 is a central cross-section. In conjunction with FIG. 4 to FIG. 6, the lens 3 includes two types of cross-sectional profiles respectively in the longitudinal direction and the lateral direction. Referring to FIG. 5, the central cross-sectional profile in the longitudinal direction of the lens 3 is defined as a first profile; referring to FIG. 6, the central cross-sectional profile of the lens 3 in the lateral direction is defined as a second profile. In other alternative examples, the light incident surface 31 and the light emission surface 32 of the lens 3 may have other configurations.

The first profile includes a first light incident surface 311 and a first light emission surface 321; the first light incident surface 311 belongs to the inner surface 31; and the first light emission surface 321 belongs to the outer surface 32. The first profile is an axisymmetric pattern. The first light incident surface 311 and the first light emission surface 321 are both regular curved surfaces; and a curvature of the first light incident surface 311 is greater than a curvature of the first light emission surface 321. In this example, the first light incident surface 311 is a semi-ellipsoid; and the first light emission surface 321 is an axisymmetric curved surface.

The second profile includes a second light incident surface 312 and a second light emission surface 322; the second light incident surface 312 belongs to the inner surface 31; and the second light emission surface 322 belongs to the outer surface 32. Both the second light incident surface 312 and the second light emission surface 322 are regular curved surfaces and are axisymmetric patterns, but the second profile is a non-axisymmetric pattern, that is, a symmetry axis of the second light incident surface 312 is parallel to but not coincident with a symmetry axis of the of the second light emission surface 322. In this example, the second light incident surface 312 and the second light emission surface 322 are both semi-ellipsoids.

In this example, in the longitudinal direction, a position corresponding to maximum intensity after light distribution by the lens 3 is at an angle of 75°.

In order to reduce reflectance of the light transmissive portion 41 to light emitted at a large angle, it is necessary to reduce an incident angle, incident to the light transmissive portion 41, of the light emitted at the large angle; that is, it is necessary to reduce an included angle between the light emitted at a large angle and a corresponding normal line at an incident point thereof on the light transmissive portion 41, and thus, the light transmissive portion 41 is designed to have an arc shape. The light transmissive portion 41 may be made of glass or plastic.

A height h of the light transmissive portion 41 is a distance between a highest point and a lowest point of an inner surface of the light transmissive portion 41, and a length of the light transmissive portion 41 is a distance between two end points of the inner surface of the light transmissive portion 41 in the longitudinal direction. In this example, a cross-section of the light transmissive portion 41 is semicircular, that is, the height h of the light transmissive portion 41 is ½ of the length b of the light transmissive portion 41. A lens located at the center is defined as a center lens 3a; and light emitted from the center lens 3a at an angle of 75° has an incident angle $\alpha_1$ of 8° when incident on the light transmissive portion 41, which, thus, greatly reduces change in light intensity when the light emitted at an angle corresponding to maximum intensity is emitted through the front cover 4, so that a smaller light distribution change occurs during the light is emitted through the light transmissive portion 41. It is concluded that, in a case where the cross-section of the light transmissive portion 41 is semicircular, even if a profile of the center lens 3a is any other profile, regardless of whichever angle the light corresponding to the maximum intensity after distribution is located at, the incident angle of the light on the light transmissive portion 41 is not larger than 8°.

A lens farthest from the center is defined as an edge lens 3b; among all the incident angles of the light incident on the light transmissive portion 41, an incident angle of a certain beam of light emitted from the edge lens 3b is a maximum incident angle, which is a critical value. Referring to FIG. 3, light from the edge lens 3b has a maximum incident angle $\alpha_2$ of 36° when incident on the light transmissive portion 41. Then, in this example, the light transmissive portion 41 satisfies that incident angles corresponding to all light incident to any point of the light transmissive portion 41 are all smaller than A, where A is 36°. If a distance between the edge lens 3b and the center lens 3a is larger, A may be larger than 36°, but must be smaller than 45°. From correspondence relationship between the incident angle and the reflectance in Table 1, it can be seen that, the reflectance increases significantly after the incident angle is larger than 45°, while the reflectance changes little when the incident angle is smaller than 45°. Therefore, the present disclosure controls a part that is necessary to effectively control the reflectance, that is, makes the incident angle less than 45°.

The incident angle is controlled within 45°, that is, light transmittance of the light transmissive portion 41 is controlled above 90%, which greatly reduces change in light intensity of all light incident on the light transmissive portion 41 so that a smaller light distribution change occurs during the light is emitted through the light transmissive portion 41, and improves the light distribution efficiency of the lighting device 100.

Figure 7:
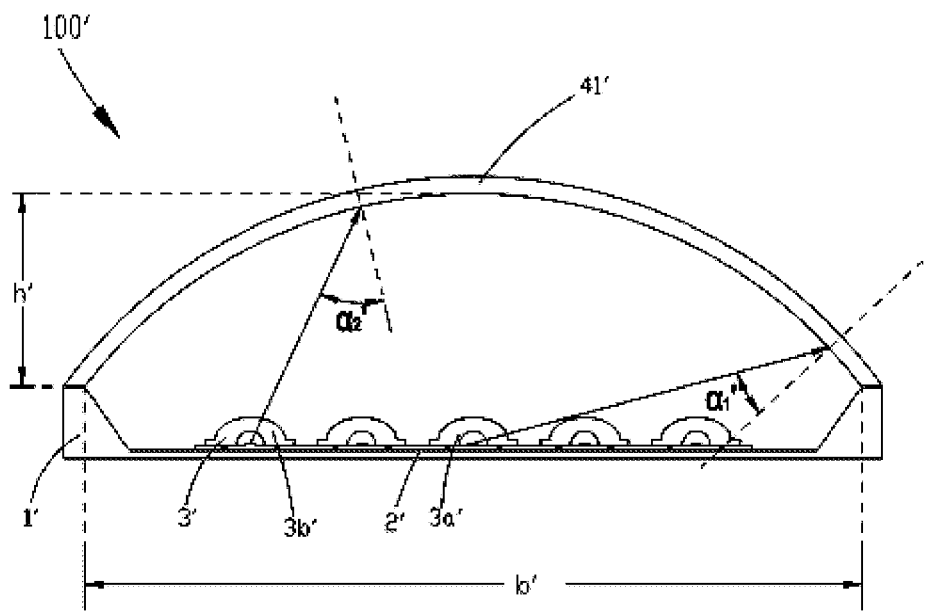
FIG. 7 is a cross-sectional schematic view of a lighting device according to Example 2 of the present disclosure.

Referring to FIG. 7, Example 2 of the present disclosure provides a lighting device 100', comprising a light body 1', a light source module mounted in the light body 1', and a light transmissive portion 41' covering the light source module, in which, the light source module includes a light-emitting component 2' and a plurality of lenses 3' that distribute light from the light-emitting component 2', and light emitted from the lens 3' is emitted through the light transmissive portion 41'.

In the lighting device 100', except for that a structure of the light transmissive portion 41' is different from the structure of the light transmissive portion 41 in the lighting device 100 according to Example 1, other structures such as the light body 1', the light-emitting component 2' and the lens 3' as well as modes they combine with each other are the same as those according to Example 1.

The light transmissive portion 41' is arc-shaped; and in this example, a height h' of the light transmissive portion 41' is ¼ of a length b' of the light transmissive portion 41'. Light emitted from a center lens 3a' at an angle of 75° has an incident angle $\alpha_1'$ of 28° when incident on the light transmissive portion 41', which, thus, greatly reduces change in light intensity when the light emitted at an angle corresponding to maximum intensity is emitted through the front cover 4', so that a smaller light distribution change occurs during the light is emitted through the light transmissive portion 41'. It is concluded that, in this example, even if a profile of the center lens 3a' is any other profile, regardless of whichever angle light corresponding to the maximum intensity after distribution is located at, the incident angle of the light on the light transmissive portion 41' is not larger than 28°.

A lens farthest from the center is defined as an edge lens 3b; among all the incident angles of the light incident on the light transmissive portion 41', an incident angle of a certain beam of light emitted from the edge lens 3b' is a maximum incident angle, which is a critical value. Referring to FIG. 5, light from the edge lens 3b' has a maximum incident angle $\alpha_2 \rightarrow$ of 38° when incident on the light transmissive portion 41'. Then, in this example, the light transmissive portion 41' satisfies that incident angles corresponding to all light incident to any point of the light transmissive portion 41' are all smaller than A', where A' is 38°. If a distance between the edge lens 3b' and the center lens 3a' is larger, A' may be larger than 38°, but must be smaller than 45°, which, thus, greatly reduces change in light intensity of all light incident on the light transmissive portion 41', so that a smaller light distribution change occurs during the light is emitted through the light transmissive portion 41', and improves the light distribution efficiency of the lighting device 100'.

Figure 8:
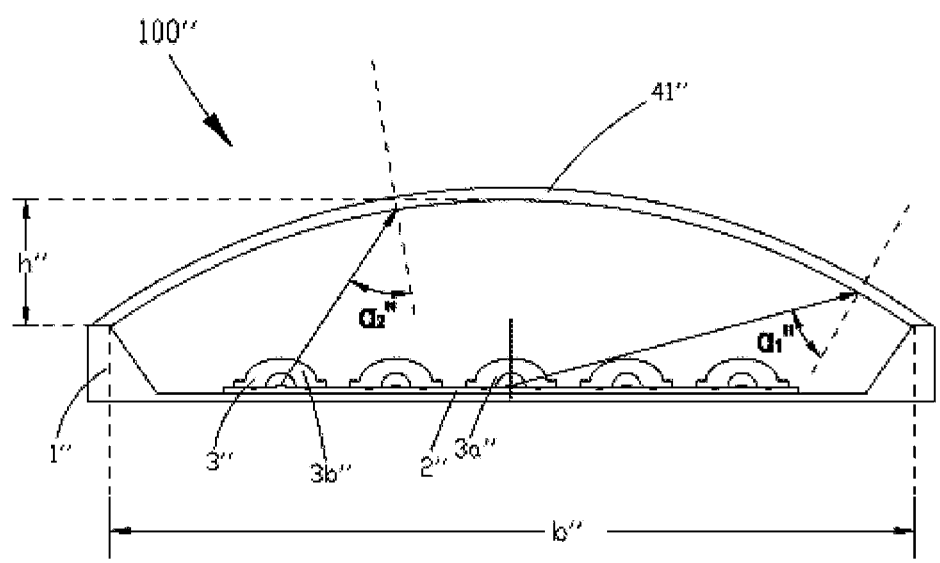
FIG. 8 is a cross-sectional schematic view of a lighting device according to Example 3 of the present disclosure.

Referring to FIG. 8, Example 3 of the present disclosure provides a lighting device 100", comprising a light body 1", a light source module mounted in the light body 1", and a light transmissive portion 41" covering the light source module, in which, the light source module includes a light-emitting component 2" and a plurality of lenses 3" that distribute light from the light-emitting component 2", and light emitted from the lens 3" is emitted through the light transmissive portion 41".

In the lighting device 100", except for that a structure of the light transmissive portion 41" is different from the structure of the light transmissive portion 41 of the front cover 4 in the lighting device 100 according to Example 1, other structures such as the light body 1", the light-emitting component 2" and the lens 3" as well as modes they combine with each other are the same as those according to Example 1.

The light transmissive portion 41" is arc-shaped; and in this example, a height h" of the light transmissive portion 41" is 1/6.3 of a length b" of the light transmissive portion 41". Light emitted from a center lens 3a" at an angle of 75° has an incident angle $\alpha_1'$ of 45° when incident on the light transmissive portion 41", which, thus, greatly reduces change in light intensity when the light emitted at an angle corresponding to maximum intensity is emitted through the light transmissive portion 41", so that a smaller light distribution change occurs during the light is emitted through the light transmissive portion 41". It is concluded that, in this example, even if a profile of the center lens 3a" is any other profile, regardless of whichever angle light corresponding to the maximum intensity after distribution is located at, the incident angle of the light on the light transmissive portion 41" is smaller than 45°.

A lens farthest from the center is defined as an edge lens 3b"; among all the incident angles of the light incident on the light transmissive portion 41", an incident angle of a certain beam of light emitted from the edge lens 3b" is a maximum incident angle, which is a critical value. Referring to FIG. 8, light from the edge lens 3b" has a maximum incident angle $\alpha_2'$ of 43° when incident on the light transmissive portion 41". Then, in this example, the light transmissive portion 41" satisfies that incident angles corresponding to all light incident to any point of the light transmissive portion 41" are all smaller than A", where A" is 43°. If a distance between the edge lens 3b" and the center lens 3a" is larger, A" may be larger than 43°, but must be smaller than 45°, which, thus, greatly reduces change in light intensity of all light incident on the light transmissive portion 41", so that a smaller light distribution change occurs during the light is emitted through the light transmissive portion 41", and improves the light distribution efficiency of the lighting device 100".

The present disclosure provides a lighting device, comprising a light body, a light source module mounted in the light body, and a light transmissive portion covering the light source module, in which, the light source module includes a plurality of lenses and a light emitting unit accommodated in the lens, light emitted by the light emitting unit is emitted from the light transmissive portion after being distributed by the lens, the light transmissive portion is arc-shaped, and an incident angle corresponding to incident light at any point of the light transmissive portion is smaller than 45°.

Further, a length direction of the lens is a longitudinal direction, a width direction of the lens is a lateral direction, and a central cross-sectional profile of the lens in the longitudinal direction and a central cross-sectional profile of the lens in the lateral direction are different from each other.

Further, the central cross-sectional profile of the lens in the longitudinal direction is a first profile, the first profile is an axisymmetric pattern, and the first profile includes a first light incident surface and a first light emission surface.

Further, a curvature of the first light incident surface is greater than a curvature of the first light emission surface.

Further, the first light incident surface is a semi-ellipsoid, and the first light emission surface is an axisymmetric curved surface.

Further, the central cross-sectional profile of the lens in the lateral direction is a second profile, an outer surface and an inner surface of the second profile are both axisymmetric patterns, and a symmetry axis of the outer surface of the second profile and a symmetry axis of the inner surface of the second profile are parallel to each other.

Further, an angle corresponding to maximum intensity of light distributed by the lens is between 70° and 80°, and an incident angle of light corresponding to the maximum intensity in all light that is incident on the light transmissive portion is between 8° and 45°.

Further, a height of the light transmissive portion is 1/6.3 to 1/2 of a length of the light transmissive portion.

Further, the light transmissive portion is made of glass or plastic.

Further, the lighting device further comprises a light-emitting component, the light-emitting component includes a light source board and a plurality of the light emitting units provided on the light source board, and one of the lenses corresponds to one of the light emitting units, or corresponds to several ones of the light emitting units.

Further, light transmittance of the light transmissive portion is greater than 90%.

Further, the lighting device is a street lamp.

Further, the street lamp further includes a driving power supply component accommodated in the light body, and the driving power supply component is electrically connected with the light source module.

Further, the street lamp further includes a front cover connected with the light body, and the front cover includes a coated portion and the light transmissive portion.

Further, the street lamp further includes a lamp pole, and the light body is mounted on the lamp pole.

Further, the light emitting units and the lenses are all arranged in an array.

Further, the lighting device further comprises a reflector provided in the light body, and the reflector is provided on a periphery of the light source module.

As compared with other implementations, in the lighting device according to the present disclosure, by designing the light transmissive portion to be arc-shaped, the incident angle corresponding to the incident light on the light transmissive portion is limited within 45°, which, thus, reduces the reflectance of the light transmissive portion to the incident light, so that a smaller light distribution change occurs during the light is emitted through the light transmissive portion, and improves light distribution efficiency of the lighting device.

The present disclosure also provides a method of manufacturing a lighting device. The method may include providing a light body; mounting a light source module on the light body; covering the light source module using a light transmissive portion; providing the light source module with a plurality of lenses and a light emitting unit accommodated in each of the plurality of lenses; and emitting light by the light emitting unit from the light transmissive portion after being distributed by the lens, where the light transmissive portion may be arc-shaped, and an incident angle corresponding to incident light at any point of the light transmissive portion may be smaller than 45°.

The method may also include providing a longitudinal direction for a length direction of the lens; providing a lateral direction for a width direction of the lens; and where a central cross-sectional profile of the lens in the longitudinal direction and a central cross-sectional profile of the lens in the lateral direction may be different.

In the method, the central cross-sectional profile of the lens in the longitudinal direction is a first profile wherein the first profile is an axisymmetric pattern, and the first profile comprises a first light incident surface and a first light emission surface.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit,"

"sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be understood that the foregoing examples merely are some examples of the present disclosure, and not intended to limit the present disclosure. Any modification, equivalent substitution, improvement, and the like, made within the spirit and principles of the present disclosure should be covered within the protection scope of the present disclosure.

The invention claimed is:

1. A lighting device, comprising: a light body, a light source module mounted on the light body, and a light transmissive portion covering the light source module, wherein:
the light source module comprises a plurality of lenses and a light emitting unit accommodated in each of the plurality of lenses, and light emitted by the light emitting unit is emitted from the light transmissive portion after being distributed by each of the plurality of lenses,
the light transmissive portion is arc-shaped, and an incident angle corresponding to incident light emitted by each light emitting unit in the light source module at each point of the light transmissive portion is smaller than 45°, wherein the plurality of lenses and the light emitting unit accommodated in each of the plurality of lenses are covered under the light transmissive portion.

2. The lighting device according to claim 1, wherein a length direction of each of the plurality of lenses is a longitudinal direction, a width direction of each of the plurality of lenses is a lateral direction, and a central cross-sectional profile of each of the plurality of lenses in the longitudinal direction and a central cross-sectional profile of each of the plurality of lenses in the lateral direction are different.

3. The lighting device according to claim 2, wherein the central cross-sectional profile of each of the plurality of lenses in the longitudinal direction is a first profile wherein the first profile is an axisymmetric pattern, and the first profile comprises a first light incident surface and a first light emission surface.

4. The lighting device according to claim 3, wherein a curvature of the first light incident surface is greater than a curvature of the first light emission surface.

5. The lighting device according to claim 3, wherein the first light incident surface is a semi-ellipsoid, and the first light emission surface is an axisymmetric curved surface.

6. The lighting device according to claim 2, wherein the central cross-sectional profile of each of the plurality of lenses in the lateral direction is a second profile wherein an outer surface and an inner surface of the second profile are both axisymmetric patterns, and a symmetry axis of the outer surface of the second profile and a symmetry axis of the inner surface of the second profile are parallel.

7. The lighting device according to claim 1, wherein an angle corresponding to a maximum intensity of light distributed by each of the plurality of lenses is between 70° and 80°, and an incident angle of light corresponding to the maximum intensity in all light that is incident on the light transmissive portion is between 8° and 45°.

8. The lighting device according to claim 1, wherein a height of the light transmissive portion is ⅙.₃ to ½ of a length of the light transmissive portion.

9. The lighting device according to claim 1, wherein the light transmissive portion is made of glass or plastic.

10. The lighting device according to claim 1, wherein the lighting device further comprises a light-emitting component, wherein the light-emitting component comprises a light source board and a plurality of the light emitting units provided on the light source board, and one of the lenses corresponds to one of the light emitting units or corresponds to several ones of the light emitting units.

11. The lighting device according to claim 1, wherein a light transmittance of the light transmissive portion is greater than 90%.

12. The lighting device according to claim 1, wherein the lighting device is a street lamp.

13. The lighting device according to claim 12, wherein the street lamp further comprises a front cover connected with the light body, and the front cover comprises a coated portion and the light transmissive portion.

14. The lighting device according to claim 12, wherein the light emitting units and the lenses are arranged in an array.

15. The lighting device according to claim 12, wherein the lighting device further comprises a reflector provided in the light body, and the reflector is provided on a periphery of the light source module.

16. A method of manufacturing a lighting device, comprising:
providing a light body;
mounting a light source module on the light body;
covering the light source module using a light transmissive portion;
providing the light source module with a plurality of lenses and a light emitting unit accommodated in each of the plurality of lenses; and
emitting light by the light emitting unit from the light transmissive portion after being distributed by each of the plurality of lenses, wherein the light transmissive portion is arc-shaped, and an incident angle corresponding to incident light emitted by each light emitting unit in the light source module at each point of the light transmissive portion is smaller than 45°, wherein the incident light is distributed by each of the plurality of lenses.

17. The method according to claim 16, further comprising:
providing a longitudinal direction for a length direction of each of the plurality of lenses;
providing a lateral direction for a width direction of each of the plurality of lenses; and
wherein a central cross-sectional profile of the lens in the longitudinal direction and a central cross-sectional profile of each of the plurality of lenses in the lateral direction are different.

18. The method according to claim 17, wherein the central cross-sectional profile of each of the plurality of lenses in the longitudinal direction is a first profile wherein the first profile is an axisymmetric pattern, and the first profile comprises a first light incident surface and a first light emission surface.

19. The lighting device according to claim 1, wherein the light transmissive portion has a height and a length, and the height is no greater than ½ of the length.

20. The method according to claim 16, wherein the light transmissive portion has a height and a length, and the height is no greater than ½ of the length.

\* \* \* \* \*